(12) United States Patent
Hodono et al.

(10) Patent No.: US 11,829,015 B2
(45) Date of Patent: Nov. 28, 2023

(54) POROUS LIQUID CRYSTAL POLYMER SHEET AND WIRING CIRCUIT BOARD

(71) Applicant: NITTO DENKO CORPORATION, Ibaraki (JP)

(72) Inventors: Masayuki Hodono, Ibaraki (JP); Akihito Matsutomi, Ibaraki (JP); Tomohiro Taruno, Ibaraki (JP); Yoshinori Kouno, Ibaraki (JP); Hidenori Onishi, Ibaraki (JP); Shunsuke Shuto, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 17/708,973

(22) Filed: Mar. 30, 2022

(65) Prior Publication Data

US 2022/0326551 A1    Oct. 13, 2022

(30) Foreign Application Priority Data

Mar. 31, 2021   (JP) ................ 2021-060769

(51) Int. Cl.
  *G02F 1/1333*   (2006.01)
  *C09K 19/38*   (2006.01)
  *G02F 1/00*   (2006.01)

(52) U.S. Cl.
  CPC ........ *G02F 1/133305* (2013.01); *C09K 19/38* (2013.01); *C09K 19/3809* (2013.01); *G02F 1/0045* (2013.01); *B32B 2305/026* (2013.01); *B32B 2457/08* (2013.01); *C09K 2219/03* (2013.01)

(58) Field of Classification Search
  CPC ............. G02F 1/0045; G02F 1/133305; C09K 2219/03; B32B 2305/026; B32B 2457/08
  See application file for complete search history.

(56) References Cited

U.S. PATENT DOCUMENTS

| | | |
|---|---|---|
| 5,681,624 A | 10/1997 | Moriya |
| 2010/0239744 A1 | 9/2010 | Sato et al. |
| 2013/0088406 A1 | 4/2013 | Hamada et al. |
| 2019/0263996 A1 | 8/2019 | Nakamura et al. |
| 2019/0352565 A1 | 11/2019 | Nishi et al. |

FOREIGN PATENT DOCUMENTS

| | | | |
|---|---|---|---|
| CN | 103702511 A | * | 4/2014 |
| EP | 2 157 123 A1 | | 2/2010 |
| JP | H7-323506 A | | 12/1995 |
| JP | 2004-189867 A | | 7/2004 |
| JP | 2005169971 A | * | 6/2005 |
| JP | 2008-308669 A | | 12/2008 |
| JP | 2018-21171 A | | 2/2018 |
| JP | 2020-147670 A | | 9/2020 |
| WO | 2011/152538 A1 | | 12/2011 |

OTHER PUBLICATIONS

Extended European Search Report dated Jul. 27, 2022 for corresponding European Patent Application No. 22164214.3 (6 pages).

* cited by examiner

*Primary Examiner* — Sophie Hon
(74) *Attorney, Agent, or Firm* — HAUPTMAN HAM, LLP (57) ABSTRACT

A porous liquid crystal polymer sheet and a wiring circuit board have excellent handleability and excellent low repulsive properties. The porous liquid crystal polymer sheet 1 has a porosity P of 20% or more and 90% or less. The porous liquid crystal polymer sheet 1 has a thickness T of 1 μm or more and 240 μm or less.

24 Claims, 5 Drawing Sheets

POROUS LIQUID CRYSTAL POLYMER SHEET AND WIRING CIRCUIT BOARD

CROSS-REFERENCE TO RELATED APPLICATION

The present application claims priority from Japanese Patent Application No. 2021-060769 filed on Mar. 31, 2021, the contents of which are hereby incorporated by reference into this application.

TECHNICAL FIELD

The present invention relates to a porous liquid crystal polymer sheet and a wiring circuit board.

BACKGROUND ART

An antenna board including a foaming liquid crystal polymer has been known (ref: for example, Patent Document 1 below). In Patent Document 1, the antenna board in a state of being bent is incorporated into a case of an antenna device.

CITATION LIST

Patent Document

Patent Document 1: WO2011/152538

SUMMARY OF THE INVENTION

Problem to be Solved by the Invention

From the viewpoint of miniaturization of the device, an inner space of the case is narrowed. Therefore, excellent low repulsive properties are required for the above-described antenna board.

However, in the antenna board described in Patent Document 1, there is a problem that it does not have excellent low repulsive properties described above.

On the other hand, the antenna board is also required to have excellent handleability, while maintaining its shape.

The present invention provides a porous liquid crystal polymer sheet and a wiring circuit board having excellent low repulsive properties, while having excellent handleability.

Means for Solving the Problem

The present invention (1) includes a porous liquid crystal polymer sheet having a porosity P of 20% or more and 90% or less, and a thickness T of 1 μm or more and 240 μm or less.

The present invention (2) includes the porous liquid crystal polymer sheet described in (1) having a melting point of 200° C. or more.

The present invention (3) includes the porous liquid crystal polymer sheet described in (1) or (2), wherein a repulsive force R in a low repulsion test described below is 50 [mN/mm] or less.

<Low Repulsion Test>

The porous liquid crystal polymer sheet is processed into a size of a length of 30 mm and a width of 10 mm to fabricate a sample. The sample is bent so that both end portions in a longitudinal direction of the sample get close to each other, one surfaces in a thickness direction of both end portions face each other, and a distance between the other surfaces in the thickness direction of both end portions is 3 mm A repulsive force in an opposing direction of the bent porous liquid crystal polymer sheet is measured.

The present invention (4) includes the porous liquid crystal polymer sheet described in (3), wherein the repulsive force R [mN/mm], the thickness T [μm], and the porosity P [%] satisfy Formula [1] below.

$$R/(T/P) \leq 12.5 \quad [1]$$

The present invention (5) includes the porous liquid crystal polymer sheet described in any one of (1) to (4) having a dielectric constant at 10 GHz of 2.50 or less.

The present invention (6) includes a wiring circuit board including the porous liquid crystal polymer sheet described in any one of (1) to (5) as an insulating layer.

Effect of the Invention

The porous liquid crystal polymer sheet and the wiring circuit board of the present invention have excellent low repulsive properties, while maintaining its sheet shape.

BRIEF DESCRIPTION OF THE DRAWINGS

FIG. 3A illustrating a first step and
FIG. 3B illustrating a second step.

FIG. 4A illustrating a fourth step,
FIG. 4B illustrating a fifth step,
FIG. 4C illustrating a sixth step, and
FIG. 4D illustrating a seventh step.

DESCRIPTION OF EMBODIMENTS

A porous liquid crystal polymer sheet of the present invention has, for example, a thickness and has a sheet shape. The sheet shape includes a film shape. The porous liquid crystal polymer sheet extends in a plane direction. The plane direction is perpendicular to a thickness direction.

The porous liquid crystal polymer sheet has a large number of fine pores. Also, examples of a foaming structure of the porous liquid crystal polymer sheet include a closed-cell structure, an open-cell structure, and a semi-closed-cell and semi-open-cell structure. Preferably, a closed-cell structure is used.

<Porosity P of Porous Liquid Crystal Polymer Sheet>

The porous liquid crystal polymer sheet has a porosity P of 20% or more and 90% or less.

In a case where the porosity P in the porous liquid crystal polymer sheet is below 20%, even when a thickness T of the porous liquid crystal polymer sheet is within a range to be described later, low repulsive properties of the porous liquid crystal polymer sheet decrease.

In a case where the porosity P in the porous liquid crystal polymer sheet is above 90%, even when the thickness T of the porous liquid crystal polymer sheet is within a range to be described later, the porous liquid crystal polymer sheet cannot maintain its sheet shape and handleability decreases.

The porous liquid crystal polymer sheet has the porosity P of preferably 27.5% or more, more preferably 30% or more, further more preferably 45% or more, particularly preferably 56% or more. Further, the porous liquid crystal polymer sheet has the porosity P of preferably 75% or less, more preferably 65% or less, further more preferably 55% or less, particularly preferably 50% or less.

The porosity P of the porous liquid crystal polymer sheet is determined with an electron specific gravimeter. Alternatively, it is also possible to determine the porosity P of the porous liquid crystal polymer sheet using a non-porous liquid crystal polymer film corresponding to the porous liquid crystal polymer sheet. Specifically, each of a specific gravity G1 of the porous liquid crystal polymer sheet and a specific gravity G0 of the non-porous liquid crystal polymer sheet is measured, and the porosity P of the porous liquid crystal polymer sheet is determined by the following formula.

$$P=100\times(1-G1/G0)$$

P: porosity of the porous liquid crystal polymer sheet
G1: specific gravity of the porous liquid crystal polymer sheet
G0: specific gravity of the non-porous liquid crystal polymer sheet A size of the pore in the porous liquid crystal polymer sheet is not limited. The pore may or may not have an aspect ratio. When the pore has the aspect ratio, the shortest length is, for example, 0.01 μm or more, preferably 0.1 μm or more, and for example, 2 μm or less, preferably 1 μm or less. The longest length is, for example, 0.1 μm or more, preferably 1 μm or more, and for example, 50 μm or less, preferably 25 μm or less. When the pore does not have the aspect ratio, the pore has a spherical shape. The above-described size of the pore is measured by image analysis of a cross-sectional SEM image.

<Thickness T of Porous Liquid Crystal Polymer Sheet>

The porous liquid crystal polymer sheet has the thickness T of 1 μm or more and 240 μm or less.

In a case where the thickness T of the porous liquid crystal polymer sheet is below 1 μm, even when the porosity P of the porous liquid crystal polymer sheet is within the above-described range, the porous liquid crystal polymer sheet cannot maintain its sheet shape and the handleability decreases.

In a case where the thickness T of the porous liquid crystal polymer sheet is above 240 μm, even when the porosity P of the porous liquid crystal polymer sheet is within the above-described range, the low repulsive properties of the porous liquid crystal polymer sheet decrease.

The porous liquid crystal polymer sheet has the thickness T of preferably 10 μm or more, more preferably 50 μm or more, further more preferably 100 μm or more, and preferably 225 μm or less, more preferably below 200 μm, further more preferably 185 μm or less, particularly preferably 175 μm or less.

The thickness of the porous liquid crystal polymer sheet is, for example, measured with a contact-type film thickness meter.

<Other Properties of Porous Liquid Crystal Polymer Sheet>
<Repulsive Force>

The porous liquid crystal polymer sheet in the following low repulsion test preferably has a repulsive force of, for example, 100 mN/mm or less, preferably 50 mN/mm or less, more preferably 35 mN/mm or less, further more preferably 20 mN/mm or less, particularly preferably 15 mN/mm or less, moreover 10 mN/mm or less. When the repulsive force is the above-described upper limit or less, the porous liquid crystal polymer sheet has an excellent repulsive force.

A lower limit of the repulsive force of the porous liquid crystal polymer sheet in the low repulsion test is not limited. The lower limit of the repulsive force of the porous liquid crystal polymer sheet in the low repulsion test is, for example, 0.1 mN/mm, furthermore, 1 mN/mm <Low Repulsion Test>

Figure 1:
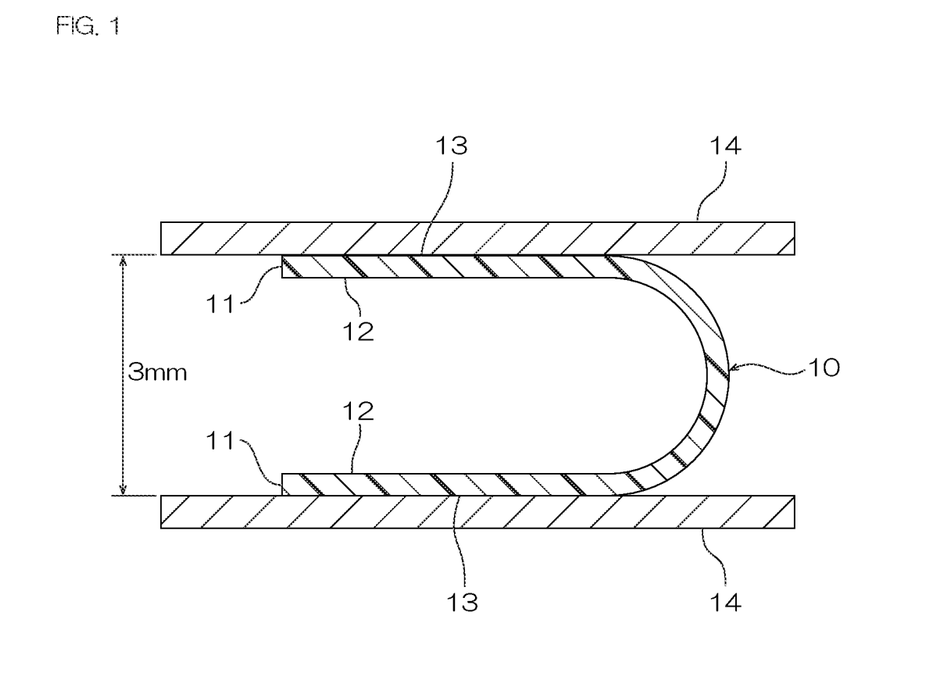
FIG. 1 shows a schematic view of a low repulsion test of a porous liquid crystal polymer sheet.

The porous liquid crystal polymer sheet is processed into a size of a length of 30 mm and a width of 10 mm to fabricate a sample 10. As shown in FIG. 1, the sample 10 is bent so that both end portions 11 in a longitudinal direction of the sample 10 get close to each other, one surfaces 12 in the thickness direction of both end portions 11 face each other, and a distance between the other surfaces 13 in the thickness direction of both end portions 11 is 3 mm. When the sample 10 is bent, each of two plates 4 is brought into contact with each of both end portions of the other surfaces 13 in the thickness direction. The two plates are in parallel. The repulsive force in an opposing direction of the bent sample 10 is measured.

A repulsive force R [mN/mm] of the above-described porous liquid crystal polymer sheet, the thickness T [μm] of the porous liquid crystal polymer sheet, and the porosity P [%] of the porous liquid crystal polymer sheet, for example, satisfy Formula [1] below, preferably satisfy Formula [2] below, more preferably satisfy Formula [3] below.

$$R/(T/P) \leq 12.5 \quad [1]$$

$$R/(T/P) \leq 10.0 \quad [2]$$

$$R/(T/P) \leq 7.5 \quad [3]$$

R: repulsive force of the porous liquid crystal polymer sheet [mN/mm]
T: thickness of the porous liquid crystal polymer sheet [μm]
P: porosity of the porous liquid crystal polymer sheet [%]

When the above-described formula is satisfied, the porous liquid crystal polymer sheet can maintain its shape and has excellent low repulsive properties, while having excellent handleability.

As to Formula [1], a line segment L1 in which R/(T/P)=12.5 is drawn by a solid line. When Formula [1] is satisfied, R and T/P are plotted on the above-described line segment L1 and in a region located below it.

As to Formula [2], a line segment L2 in which R/(T/P)=10.0 is drawn by a dashed line. When Formula [2] is satisfied, R and T/P are plotted on the above-described line segment L2 and in a region located below it.

As to Formula [3], a line segment L3 in which R/(T/P)=7.5 is drawn by a two-dotted dashed line. When Formula [3] is satisfied, R and T/P are plotted on the above-described line segment L3 and in a region located below it.

<Second Low Repulsion Test>

In addition, the porous liquid crystal polymer sheet, for example, does not produce a crease in the following second low repulsion test.

Figure 2:
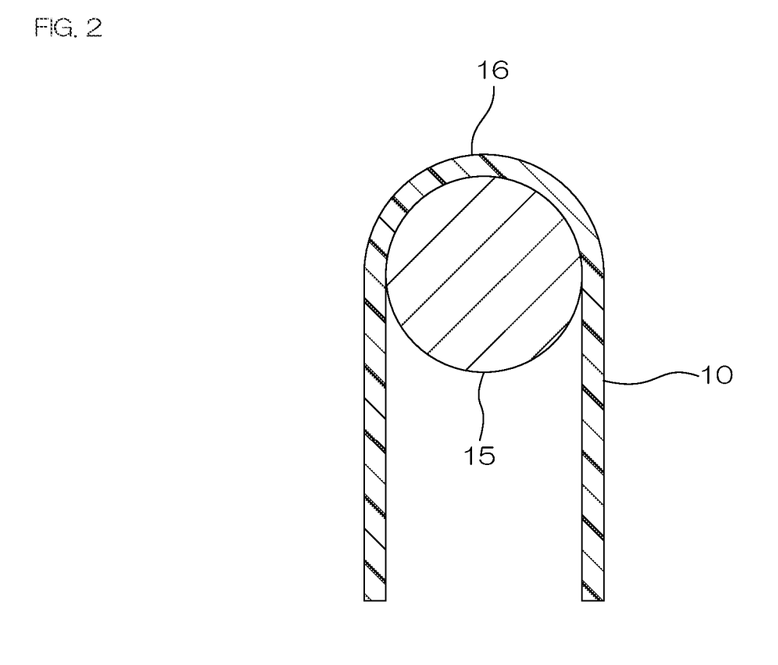
FIG. 2 shows a schematic view of a second low repulsion test.

In the second low repulsion test, first, the porous liquid crystal polymer sheet is processed into a size of a length of 30 mm and a width of 10 mm to fabricate the sample 10. Next, as shown in FIG. 2, a central portion 16 of the sample 10 is wound around a rod 15 having a radius of 6 mm. At that time, a presence or absence of a crease in the central portion 16 is visually observed. In the second low repulsion test, the two plates 14 (FIG. 1) used in the above-described low repulsion test are not used.

<Dielectric Constant>

The porous liquid crystal polymer sheet preferably has a dielectric constant at 10 GHz of, for example, 2.50 or less, preferably 2.40 or less, more preferably 2.30 or less, further more preferably 2.10 or less, moreover 1.90 or less, moreover below 1.90, moreover 1.75 or less. When the dielectric constant of the porous liquid crystal polymer sheet is the above-described upper limit or less, the porous liquid crystal polymer sheet is low dielectric. A lower limit of the dielectric constant at 10 GHz of the porous liquid crystal polymer sheet is not limited. The dielectric constant at 10 GHz of the porous liquid crystal polymer sheet is, for example, above 1.00. A method for measuring the dielectric constant of the porous liquid crystal polymer sheet is described in Examples later.

<Melting Point>

A melting point of the porous liquid crystal polymer sheet is not limited. The porous liquid crystal polymer sheet has the melting point of, for example, 200° C. or more, preferably 220° C. or more, and for example, 400° C. or less, preferably 370° C. or less. The melting point of the porous liquid crystal polymer sheet is measured with a differential scanning calorimetry (DSC) and a thermogravimeter differential thermal analyzer (TG-DTA). Further, when the melting point of a liquid crystal polymer to be described later is known, the melting point of the liquid crystal polymer may be set as the melting point of the porous liquid crystal polymer sheet. When the melting point of the porous liquid crystal polymer sheet is the above-described lower limit or more, the handleability and processability are excellent. When the melting point of the porous liquid crystal polymer sheet is the above-described upper limit or less, heat resistance is excellent.

<Liquid Crystal Polymer>

The liquid crystal polymer which is a material for the porous liquid crystal polymer is not limited. The liquid crystal polymer is a liquid crystal thermoplastic resin. As the liquid crystal polymer, for example, a liquid crystal polyester is used, preferably, an aromatic liquid crystal polyester is used. The liquid crystal polymer is, for example, specifically described in Japanese Unexamined Patent Publications No. 2020-147670 and 2004-189867. As the liquid crystal polymer, a commercially available product can be used. Examples of the commercially available product include the UENO LCP (registered trademark, hereinafter, the same) 8100 series (low melting point-type, manufactured by UENO FINE CHEMICALS INDUSTRIES, LTD.), and the UENO LCP 5000 series (high melting point-type, manufactured by UENO FINE CHEMICALS INDUSTRIES, LTD.). Preferably, the UENO LCP 8100 series is used.

Above all, an example of a material for the porous liquid crystal polymer includes a liquid crystal polymer having a coefficient of thermal expansion (CTE) of 1 ppm/K or more, preferably 10 ppm/K or more, and for example, 40 ppm/K or less, preferably 25 ppm/K or less. When the material is the liquid crystal polymer having the coefficient of thermal expansion of the above-described lower limit or more, the porous liquid crystal polymer sheet has excellent handleability and processability. When the material is the liquid crystal polymer having the CTE of the above-described upper limit or less, the porous liquid crystal polymer sheet has excellent circuit processability.

Above all, an example of the material for the porous liquid crystal polymer includes a liquid crystal polymer having a dielectric constant of, for example, 4.0 or less, preferably 3.5 or less, and 3.0 or more. When the material is the liquid crystal polymer having the dielectric constant of the above-described upper limit or less, the porous liquid crystal polymer sheet is low dielectric.

<Method for Producing Porous Liquid Crystal Polymer Sheet>

The above-described method for producing a porous liquid crystal polymer sheet is not limited. Examples of the method for producing a porous liquid crystal polymer sheet include an extraction method and a foaming method. The above-described production methods may be used alone or in combination.

<Extraction Method>

The extraction method includes, for example, a first step, a second step, and a third step. In the extraction method, the first step to the third step are carried out in order.

<First Step>

In the first step, a liquid crystal polymer and a porosity forming agent are kneaded to prepare a composition.

The porosity forming agent is not limited. An example of the porosity forming agent includes a compound which is phase-separated from the liquid crystal polymer at a kneading temperature (described later). The phase-separation includes a case of being not dissolved in the liquid crystal polymer and ensuring a constant shape in a kneaded product. Further, as the porosity forming agent, preferably, a compound which is not thermally decomposed at the kneading temperature is used. A specific example thereof includes a compound having a mass reduction rate at 230° C. of 10% by mass or less. As the porosity forming agent, for example, a purine derivative is used, preferably, caffeine is used.

A mixing ratio of the porosity forming agent is appropriately adjusted so as to have the above-described porosity P. Specifically, a mass ratio of the porosity forming agent to 100 parts by mass of the liquid crystal polymer is, for example, 10 parts by mass or more, preferably 50 parts by mass or more, and for example, 500 parts by mass or less, preferably 250 parts by mass or less. In addition, a percentage of the volume of the porosity forming agent to the total volume of the liquid crystal polymer and the porosity forming agent is, for example, 20% by volume or more, preferably 30% by volume or more, and for example, 90% by volume or less, preferably 80% by volume or less, more preferably 70% by volume or less. The percentage of the volume of the porosity forming agent to the total volume of the liquid crystal polymer and the porosity forming agent is determined by the conversion using the specific gravity from the percentage of the mass of the porosity forming agent with respect to the total mass of the liquid crystal polymer and the porosity forming agent.

The composition may furthermore contain, for example, an additive at an appropriate ratio. Examples of the additive include fillers. Examples of the filler include hollow spheres. Examples of the hollow sphere include glass balloons. An example of the hollow sphere includes one described in Japanese Unexamined Patent Publication No. 2004-189867. Preferably, the composition does not contain the additive. When the composition does not contain the additive, it is possible to suppress fragility of the porous liquid crystal polymer sheet.

A kneading temperature is not limited. The kneading temperature is, for example, 200° C. or more, preferably 210° C. or more, and for example, 400° C. or less, preferably 300° C. or less, more preferably 230° C. or less.

Figure 3A:
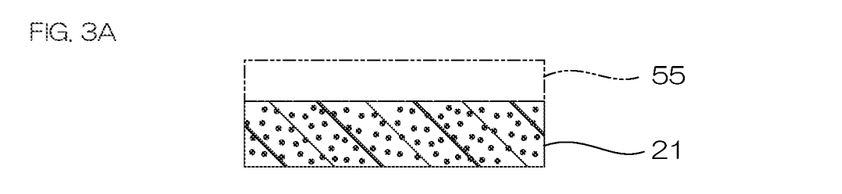
FIGS. 3A and 3B show process views for illustrating an extraction method as one example of a method for producing one embodiment of a porous liquid crystal polymer sheet of the present invention.

Subsequently, in the first step, as shown in FIG. 3A, the composition is formed into a sheet to fabricate a non-porous sheet 21. As a method for forming a sheet from the composition, for example, pressing, extrusion, and injection are used. Preferably, pressing is used, more preferably, thermal pressing is used. A temperature of the thermal pressing is, for example, 200° C. or more and 400° C. or less. A pressure of the pressing is, for example, 1 MPa or more, preferably 4 MPa or more, and for example, 20 MPa or less, preferably 10 MPa or less. Thus, the non-porous sheet 21 containing the liquid crystal polymer and the porosity forming agent is obtained.

A thickness of the non-porous sheet 21 is not limited. For example, the thickness of the non-porous sheet 21 is set to a target thickness of a porous liquid crystal polymer sheet 1.

<Second Step>

Figure 3B:
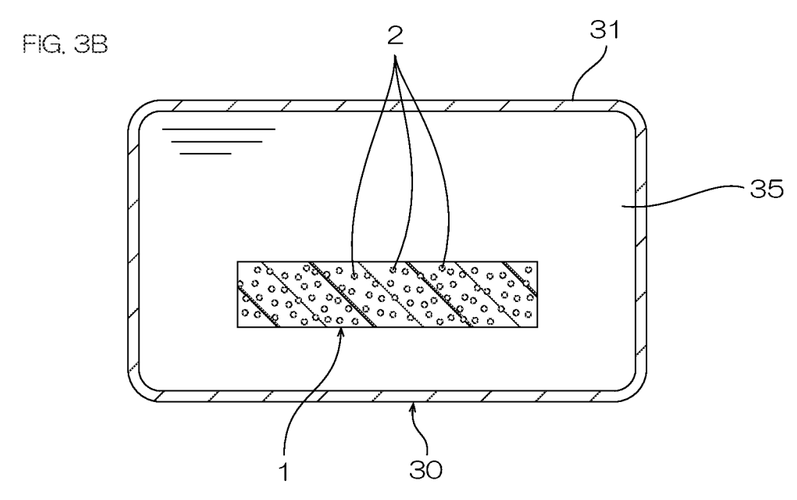

In the second step, the porosity forming agent in the composition is extracted by a supercritical fluid. Specifically, the porosity forming agent in the non-porous sheet 21 is extracted by the supercritical fluid. For example, as shown in FIG. 3B, the second step uses a supercritical device 30. The supercritical device 30 includes a pressure container 31 and a circulation device which is not shown. The pressure container 31 is capable of circulating inside, while accommodating a supercritical fluid 35. The circulation device allows the pressure container 31 to circulate the supercritical fluid 35. In addition, a collection device is provided in the circulation device. The collection device removes the porosity forming agent mixed in the supercritical fluid 35.

<Supercritical Fluid 35>

A kind of the supercritical fluid 35 is not limited. Examples of the supercritical fluid 35 include supercritical carbon dioxide and supercritical nitrogen. As the supercritical fluid 35, from the viewpoint of production cost, preferably, supercritical carbon dioxide is used.

<Entrainer>

An entrainer may be also blended into the supercritical fluid 35. The entrainer is blended into the supercritical fluid 35 to enhance the extraction efficiency of the porosity forming agent by the supercritical carbon dioxide. A mixing ratio of the entrainer is appropriately set.

In the second step, the non-porous sheet 21 is placed in the pressure container 31. Subsequently, the supercritical fluid 35 is flowed into the pressure container 31 in the supercritical device 30. Subsequently, the supercritical fluid 35 is circulated by a circulation device which is not shown. Thus, the supercritical fluid 35 is brought into contact with the non-porous sheet 21.

Then, first, the supercritical fluid 35 outside the non-porous sheet 21 is impregnated into the non-porous sheet 21. In other words, the supercritical fluid 35 infiltrates into the non-porous sheet 21. Then, the above-described supercritical fluid 35 returns to the outside of the non-porous sheet 21, while dissolving the porosity forming agent. Thus, the porosity forming agent in the non-porous sheet 21 is extracted by the supercritical fluid 35.

The conditions of the second step are not limited. A temperature of the supercritical fluid 35 is, for example, 110° C. or more, and for example, 190° C. or less. A pressure of the supercritical fluid 35 is, for example, 10 MPa or more, and for example, 30 MPa or less, preferably 27 MPa or less. The extraction time is, for example, 20 minutes or more and 60 minutes or less.

<Third Step>

In the third step, the pressure of the pressure container 31 is lowered, while the supercritical fluid 35 inside the pressure container 31 is removed. A lowering rate of the pressure is not limited. For example, the lowering rate of the pressure is adjusted so as to suppress foaming by the supercritical fluid 35 which is impregnated into the non-porous sheet 21. At this time, the pressure container 31 may be heated. A heating temperature is, for example, 150° C. or more and 300° C. or less. The heating time is, for example, 10 minutes or more and 3 hours or less.

As described above, a plurality of pores 2 are formed instead of the porosity forming agent which is impregnated into the non-porous sheet 21. Thus, the porous liquid crystal polymer sheet 1 is produced.

<Foaming Method>

The foaming method includes, for example, a fourth step, a fifth step, a sixth step, and a seventh step. In the foaming method, the fourth step to the seventh step are carried out in order.

<Fourth Step>

Figure 4A:
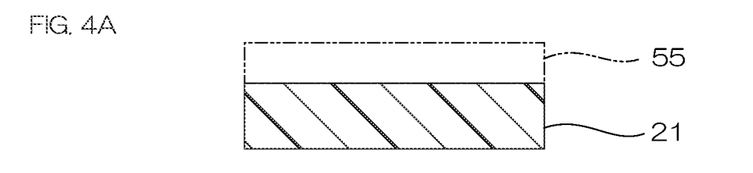
FIGS. 4A to 4D show process views for illustrating a foaming method as one example of a method for producing one embodiment of a porous liquid crystal polymer sheet of the present invention.

As shown in FIG. 4A, the fourth step forms the non-porous sheet 21. Specifically, the liquid crystal polymer is formed into a sheet to form the non-porous sheet 21. The method for forming a sheet from the liquid crystal polymer and the conditions thereof are the same as the method (including kneading) for preparing the composition in the above-described first step and the conditions thereof. However, the non-porous sheet 21 does not contain the above-described porosity forming agent. On the other hand, the non-porous sheet 21 made from the above-described liquid crystal polymer may be used as it is. Specifically, a commercially available non-porous sheet 21 may be used as it is.

<Fifth Step>

Figure 4B:
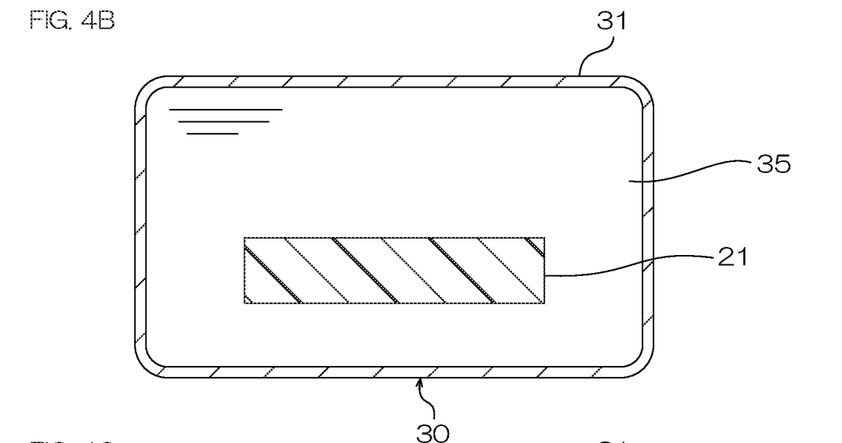

In the fifth step, as shown in FIG. 4B, the supercritical fluid 35 is impregnated into the non-porous sheet 21. Specifically, the non-porous sheet 21 is brought into contact with the supercritical fluid 35. A method for bringing the non-porous sheet 21 into contact with the supercritical fluid 35 is the same as that of the above-described second step. In the fifth step, the supercritical fluid 35 is impregnated into the non-porous sheet 21. In other words, the supercritical fluid 35 infiltrates into the non-porous sheet 21.

<Sixth Step>

Figure 4C:
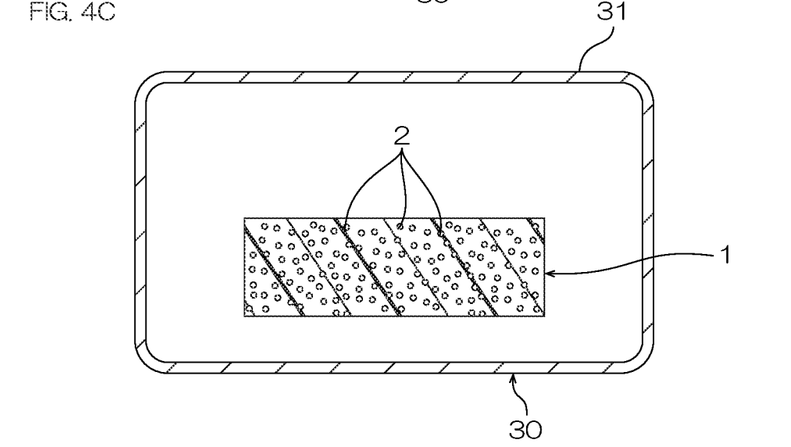

In the sixth step, as shown in FIG. 4C, the pressure of the atmosphere of the non-porous sheet impregnated with the supercritical fluid 35 is lowered. Specifically, the pressure of the pressure container 31 is lowered, while the supercritical fluid 35 inside the pressure container 31 is removed. For example, a lowering rate of the pressure is adjusted so as to promote foaming by the supercritical fluid 35 impregnated into the non-porous sheet 21. By the sixth step, the non-porous sheet 21 is foamed to obtain the porous liquid crystal polymer sheet 1 containing the plurality of pores 2. The porous liquid crystal polymer sheet 1 is large in the thickness direction and the plane direction with respect to the non-porous sheet 21 before foaming. In other words, the non-porous sheet 21 swells to become the porous liquid crystal polymer sheet 1.

<Seventh Step>

Figure 4D:
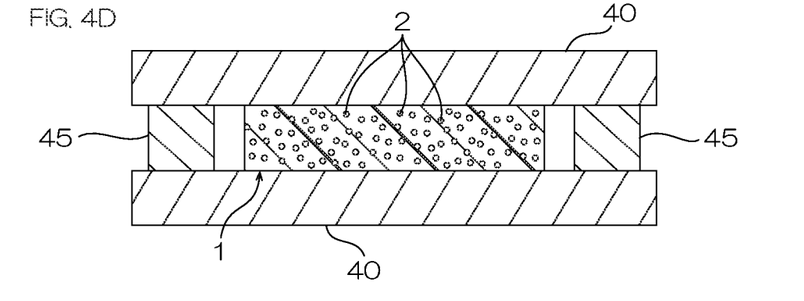

In the seventh step, the porous liquid crystal polymer sheet 1 obtained in the sixth step is thinned Examples of a method for thinning the porous liquid crystal polymer sheet 1 include pressing, extending, and rolling. Preferably, from the viewpoint of accuracy of adjustment of the thickness of the porous liquid crystal polymer sheet 1 obtained as a product, pressing is used.

Specifically, the porous liquid crystal polymer sheet 1 is pressed in the thickness direction. More specifically, the porous liquid crystal polymer sheet 1 is thermally pressed. For example, in the thermal pressing, a pressing device including two press board members 40 is used. Also in the thermal pressing, a spacer member 45 may be also disposed between the two press board members 40 and around the porous liquid crystal polymer sheet 1. In the thermal pressing, by adjusting a thickness of the spacer member 45, the thickness T of the porous liquid crystal polymer sheet 1 to be produced is adjusted. The conditions of the thermal pressing are not limited.

<Application of Porous Liquid Crystal Polymer Sheet 1>

The application of the porous liquid crystal polymer sheet 1 is not limited. Examples of the application of the porous liquid crystal polymer sheet 1 include an insulating layer of a wiring circuit board and an antenna board for wireless communication.

Figure 5:
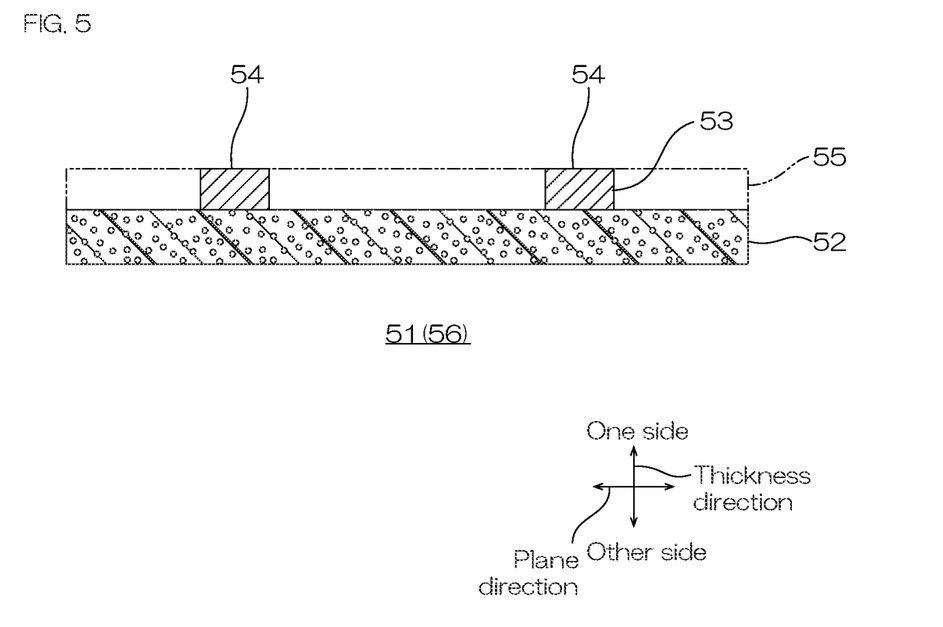
FIG. 5 shows a cross-sectional view of one embodiment of a wiring circuit board of the present invention.

Next, one example of a wiring circuit board including the porous liquid crystal polymer sheet 1 as an insulating layer is shown in FIG. 5.

As shown in FIG. 5, a wiring circuit board 51 extends in the plane direction. The wiring circuit board 51 has a sheet shape. The wiring circuit board 51 includes an insulating layer 52 and a conductive layer 53 in order toward one side in the thickness direction.

The insulating layer 52 consists of the above-described porous liquid crystal polymer sheet 1.

The conductive layer 53 is in contact with one surface in the thickness direction of the insulating layer 52. The conductive layer 53 has a predetermined wiring pattern 54.

To obtain the wiring circuit board 51, for example, a laminate board 56 including the insulating layer 52 and a conductive sheet 55 is prepared. The conductive sheet 55 is drawn by a phantom line in FIG. 5. For example, a non-porous laminate board including the above-described non-porous sheet 21 and the conductive sheet 55 (phantom line of FIG. 3A and phantom line of FIG. 4A) is prepared, and the non-porous sheet 21 in the non-porous laminate board is made porous using the above-described method (extraction method and foaming method) to obtain the above-described laminate board 56.

Thereafter, by patterning the conductive sheet 55 in the laminate board 56, the conductive layer 53 is formed. In the patterning, for example, etching is used.

<Effect>

Since the porous liquid crystal polymer sheet has the porosity P of 20% or more and 90% or less, and the thickness T of 1 µm or more and 240 µm or less, it has excellent low repulsive properties, while maintaining its sheet shape.

In addition, when the porous liquid crystal polymer sheet has the melting point of 200° C. or more, it has excellent handleability and processability.

Also, when the porous liquid crystal polymer sheet in the low repulsion test has the repulsive force R of 50 [mN/mm] or less, it has excellent low repulsive properties.

In addition, the repulsive force R [mN/mm], the thickness T [µm], and the porosity P [%] of the porous liquid crystal polymer sheet 1 satisfy Formula [1] below, it is capable of maintaining its shape, and has excellent low repulsive properties, while having excellent handleability.

$$R/(T/P) \leq 12.5 \quad [1]$$

When the dielectric constant at 10 GHz of the porous liquid crystal polymer sheet is 2.50 or less, the porous liquid crystal polymer sheet is low dielectric.

The wiring circuit board 51 shown in FIG. 5 includes the above-described porous liquid crystal polymer sheet as the insulating layer 52, it has excellent low repulsive properties, while maintaining its sheet shape.

MODIFIED EXAMPLES

In each modified example, the same reference numerals are provided for members and steps corresponding to each of those in one embodiment, and their detailed description is omitted.

Each modified example can achieve the same function and effect as that of one embodiment unless otherwise specified. Furthermore, one embodiment and the modified example thereof can be appropriately used in combination.

In the extraction method of a modified example, the seventh step (thinning the porous liquid crystal polymer sheet) may be carried out after the third step.

The foaming method of a modified example does not include the seventh step.

The wiring circuit board of a modified example includes the conductive layer, the insulating layer, and the conductive layer in order toward one side in the thickness direction.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<Production of Porous Liquid Crystal Polymer Sheet 1 by Foaming Method>

Example 1

Fourth Step

UENO LCP A8100 (melting point of 220° C., coefficient of thermal expansion of 23 ppm/K, dielectric constant at 10 GHz of 3.0) manufactured by UENO FINE CHEMICALS INDUSTRIES, LTD. as a liquid crystal polymer was kneaded with Labo Plastomill (model number: 100C100) manufactured by Toyo Seiki Seisaku-sho, Ltd. and subsequently, by using a manual hydraulic vacuum press (model number: 11FD) manufactured by Imoto Machinery Co., Ltd., the non-porous sheet 21 having a thickness of 200 µm was fabricated (fourth step, FIG. 4A). A temperature in the kneading was 210° C., and the number of rotations was 30 min$^{-1}$. A temperature was 230° C., and a pressure was 4 MPa in the pressing.

Fifth Step

By using "CO2 Supercritical Fluid Experimental Device" manufactured by AKICO Corporation, supercritical carbon dioxide as a supercritical fluid was impregnated into the non-porous sheet 21 (fifth step, FIG. 4B). A temperature of the supercritical carbon dioxide in the fifth step was 230° C., a pressure of the supercritical carbon dioxide was 25 MPa, and the impregnation time (extraction time) was 30 minutes.

Sixth Step

A pressure of the pressure container 31 was lowered, while the supercritical carbon dioxide inside the pressure container 31 was removed (sixth step, FIG. 4C). A final temperature of the pressure container 31 at that time was 30° C. By the sixth step, the porous liquid crystal polymer sheet 1 having a thickness of 0.65 mm was obtained.

Seventh Step

The porous liquid crystal polymer sheet 1 obtained in the sixth step was thinned by thermal pressing (seventh step, FIG. 4D). A temperature in the thermal pressing was 245° C., and a pressure was 2 MPa. In the thermal pressing, the spacer member 45 having a thickness of 0.05 mm was used.

Thus, the porous liquid crystal polymer sheet 1 having the plurality of pores 2 was produced.

Examples 2, 4, and 6 and Comparative Examples 1 to 3

The porous liquid crystal polymer sheet 1 was produced using the same foaming method as that in Example 1. However, the conditions of the foaming method were changed as described in Table 1.

<Production of Porous Liquid Crystal Polymer Sheet 1 by Extraction Method>

Example 3

First Step

A composition was prepared by kneading 100 parts by volume of UENO LCP A8100 (melting point of 220° C., coefficient of thermal expansion of 23 ppm/K, dielectric constant at 10 GHz of 3.0) manufactured by UENO FINE CHEMICALS INDUSTRIES, LTD. as a liquid crystal polymer, and 134 parts by volume of caffeine (mass reduction rate at 230° C.: 8% by mass) as a porosity forming agent with Labo Plastomill (model number: 100C100) manufactured by Toyo Seiki Seisaku-sho, Ltd. (first step, FIG. 3A). A temperature in the kneading was 210° C., and the number of rotations was 10 $min^{-1}$.

Subsequently, the pressing was carried out in which the non-porous sheet 21 having a thickness of 180 μm was fabricated from a kneaded product using a manual hydraulic vacuum press (model number: 11FD) manufactured by Imoto Machinery Co., Ltd., and at this time, a temperature was 230° C. and a pressure was 4 MPa.

Second Step

By using "CO2 Supercritical Fluid Experimental Device" manufactured by AKICO Corporation and by using supercritical carbon dioxide as a supercritical fluid, the porosity forming agent was extracted from the non-porous sheet 21 (second step, FIG. 3B). A temperature of the supercritical carbon dioxide in the second step was 152° C., a pressure of the supercritical carbon dioxide was 25 MPa, and the impregnation time (extraction time) was 30 minutes.

Third Step

A final temperature of the pressure container 31 was set at 175° C., while the supercritical carbon dioxide inside the pressure container 31 was removed, and the pressure of the pressure container 31 was lowered. Thus, the porous liquid crystal polymer sheet 1 having a thickness of 180 μm was obtained (third step).

Example 5

The porous liquid crystal polymer sheet 1 was produced using the same extraction method as that in Example 3. However, the conditions of the extraction method were changed as described in Table 2.

<Evaluation>

The following matters were evaluated for each of the porous liquid crystal polymer sheets 1 of Examples and Comparative Examples. The results are described in Table 3.

<Thickness T>

The thickness T of the porous liquid crystal polymer sheet 1 was measured using a contact-type film thickness meter (model number: R1-205) manufactured by OZAKI MFG. CO., LTD.

<Porosity P>

The specific gravity G1 of the porous liquid crystal polymer sheet 1, and the specific gravity G0 of the non-porous sheet 21 which consisted of the liquid crystal polymer corresponding to the porous liquid crystal polymer sheet 1 were measured using an electron specific gravimeter (model number: EW300SG) manufactured by Alfa Mirage. Thereafter, by using the following formula, the porosity P of the porous liquid crystal polymer sheet 1 was determined.

$$P=100 \times (1-G1/G0)$$

P: porosity of the porous liquid crystal polymer sheet 1
G1: specific gravity of the porous liquid crystal polymer sheet 1
G0: specific gravity of the non-porous sheet 21

<Shortest Length and Longest Length>

The shortest length and the longest length which were the size of the pore 2 in the porous liquid crystal polymer sheet 1 were measured by image analysis of cross-sectional SEM observation.

<Low Repulsion Test>

The porous liquid crystal polymer sheet 1 was processed into a size of a length of 30 mm and a width of 10 mm to fabricate the sample 10. As shown in FIG. 1, the sample 10 was bent so that both end portions 11 in the longitudinal direction of the sample 10 got close to each other, one surfaces 12 in the thickness direction of both end portions 11 faced each other, and a distance between the other surfaces 13 in the thickness direction of both end portions 11 was 3 mm. When the sample 10 was bent, each of the two plates 14 was brought into contact with each of both end portions of the other surfaces 13 in the thickness direction. The two plates were in parallel. The repulsive force R [mN/mm] in the opposing direction of the bent sample 10 was measured.

In addition, R/(T/P) was obtained, and the value thereof was also calculated. Then, when the above-described value was 12.5 or more, it was evaluated as "Bad", and when the above-described value was below 12.5, it was evaluated as "Good". A unit of the value was [mN/mm/(μm/%)].

R: repulsive force of the porous liquid crystal polymer sheet 1 [mN/mm]
T: thickness of the porous liquid crystal polymer sheet 1 [μm]
P: porosity of the porous liquid crystal polymer sheet 1 [%]

<Second Low Repulsion Test>

First, the porous liquid crystal polymer sheet 1 was processed into a size of a length of 30 mm and a width of 10 mm to fabricate the sample 10. Next, as shown in FIG. 2, the central portion 16 of the sample 10 was wound around the rod 15 having a radius of 6 mm. At that time, a presence or absence of a crease in the central portion 16 was visually observed. The porous liquid crystal polymer sheet 1 in which the crease was not observed was evaluated as "Good", and the porous liquid crystal polymer sheet 1 in which the crease was observed was evaluated as "Bad".

<Dielectric Constant>

A dielectric constant at 10 GHz of the porous liquid crystal polymer sheet 1 was measured by a SPDR method in conformity with ASTMD150 using "10 GHzSPDR resonator" manufactured by QWED Company.

<Melting Point>

Since the melting point of UENO LCP A8100 manufactured by UENO FINE CHEMICALS INDUSTRIES, LTD. as a liquid crystal polymer was 220° C., 220° C. was obtained as the melting point of the porous liquid crystal polymer sheet 1.

TABLE 1

| Ex./ Comparative Ex. | Producton Method | Fifth Step Supercritical Carbon Dioxide | | | Seventh Step Thermal Pressing Thickness of Spacer Member (mm) |
| --- | --- | --- | --- | --- | --- |
| | | Temperature (° C.) | Pressure (MPa) | Time (min) | |
| Ex. 1 | Foaming Method | 230 | 25 | 30 | 0.05 |
| Ex. 2 | Foaming Method | 213 | 25.5 | 30 | 0.1 |
| Ex. 4 | Foaming Method | 218 | 25.5 | 30 | 0.2 |
| Ex. 6 | Foaming Method | 230 | 25 | 30 | 0.25 |
| Comparative Ex. 1 | Foaming Method | 233 | 25 | 30 | 0.25 |
| Comparative Ex. 2 | Foaming Method | 233 | 25 | 30 | 0.3 |
| Comparative Ex. 3 | Foaming Method | 233 | 25 | 30 | 0.35 |

TABLE 2

| Ex./ Comparative Ex. | Production Method | First Step Thickness of Non-Porous Sheet (μm) | Second Step (Supercritical Carbon Dioxide) | | |
| --- | --- | --- | --- | --- | --- |
| | | | Temperature (° C.) | Pressure (MPa) | Time (min) |
| Ex. 3 | Extraction Method | 180 | 152 | 25 | 30 |
| Ex. 5 | Extraction Method | 200 | 169 | 25 | 30 | illustrative purpose only and it is not to be construed as limiting the scope of the present invention. Modification and variation of the present invention that will be obvious to those skilled in the art is to be covered by the following claims.

DESCRIPTION OF REFERENCE NUMERALS

1 Porous liquid crystal polymer sheet
10 Sample
11 Both end portions
12 One surface
13 Other surface
14 Plate
51 Wiring circuit board
52 Insulating layer
P Porosity
R Repulsive force

The invention claimed is:

1. A porous liquid crystal polymer sheet having
a porosity P of 20% or more and 90% or less, and
a thickness T of 1 um or more and 240 um or less,
wherein
a repulsive force R of the porous liquid crystal polymer sheet in a low repulsion test described below is 50 [mN/mm] or less, and
the repulsive force R [mN/mm], the thickness T [μm], and the porosity P [%] satisfy Formula [1] below:

$$R/(T/P) < (\text{less than}) \ 12.5 \quad [1],$$

wherein in the low repulsion test,
the porous liquid crystal polymer sheet is processed into a size of a length of 30 mm and a width of 10 mm to fabricate a sample;
the sample is bent so that both end portions in a longitudinal direction of the sample get close to each other, surfaces in a thickness direction of both end portions face each other, and a distance between other surfaces in the thickness direction of both end portions is 3 mm; and

TABLE 3

| Ex./ Comparative Ex. | Thickness T μm | Porosity P % | Thickness T/Porosity P μm/% | Pore Size (Shortest Length-Longest Length) | R/(T/P) mN/mm μm/% | 12.5 or more: Good Below 12.5: Bad | Low Repulsion Test mN/mm | Second Low Repulsion Test | Dielectric Constant | Melting Point ° C. | Production Method |
| --- | --- | --- | --- | --- | --- | --- | --- | --- | --- | --- | --- |
| Ex. 1 | 31 | 28 | 1.1 | 0.5-1 | 1.9 | Good | 2.1 | Good | 2.44 | 220 | Foaming Method |
| Ex. 2 | 112 | 44 | 2.5 | 0.5-2 | 9.9 | Good | 25 | Good | 2.12 | 220 | Foaming Method |
| Ex. 3 | 186 | 56 | 3.3 | 1-10 | 5.1 | Good | 17 | Good | 1.88 | 220 | Extraction Method |
| Ex. 4 | 184 | 31 | 5.9 | 0.5-3 | 2.3 | Good | 14 | Good | 2.38 | 220 | Foaming Method |
| Ex. 5 | 200 | 55 | 3.6 | 1-10 | 4.5 | Good | 16 | Good | 1.90 | 220 | Extraction Method |
| Ex. 6 | 228 | 68 | 3.4 | 0.5-3 | 11.2 | Good | 38 | Good | 1.65 | 220 | Foaming Method |
| Comparative Ex. 1 | 243 | 27 | 9.0 | 0.5-3 | 17.6 | Bad | 158 | Bad | 2.46 | 220 | Foaming Method |
| Comparative Ex. 2 | 301 | 63 | 4.8 | 0.5-4 | 15.1 | Bad | 72 | Bad | 1.75 | 220 | Foaming Method |
| Comparative Ex. 3 | 370 | 75 | 4.9 | 0.5-4 | 18.6 | Bad | 92 | Bad | 1.50 | 220 | Foaming Method |

While the illustrative embodiments of the present invention are provided in the above description, such is for the repulsive force R in an opposing direction of the bent sample is measured.

2. The porous liquid crystal polymer sheet according to claim 1 having a melting point of 200° C. or more.

3. The porous liquid crystal polymer sheet according to claim 1 having a dielectric constant at 10 GHz of 2.50 or less.

4. The porous liquid crystal polymer sheet according to claim 2 having a dielectric constant at 10 GHz of 2.50 or less.

5. A wiring circuit board comprising:
the porous liquid crystal polymer sheet according to claim 3 as an insulating layer.

6. A wiring circuit board comprising:
the porous liquid crystal polymer sheet according to claim 4 as an insulating layer.

7. A wiring circuit board comprising:
the porous liquid crystal polymer sheet according to claim 1 as an insulating layer.

8. A wiring circuit board comprising:
the porous liquid crystal polymer sheet according to claim 2 as an insulating layer.

9. A porous liquid crystal polymer sheet having
a porosity P of 20% or more and 90% or less, and
a thickness T of 1 μm or more and 240 μm or less,
wherein
a repulsive force R of the porous liquid crystal polymer sheet in a low repulsion test described below is 50 [mN/mm] or less, and
the repulsive force R [mN/mm], the thickness T [μm], and the porosity P [%] satisfy Formula [2] below:

$$R/(T/P) \leq 10.0 \quad [2],$$

wherein in the low repulsion test,
the porous liquid crystal polymer sheet is processed into a size of a length of 30 mm and a width of 10 mm to fabricate a sample;
the sample is bent so that both end portions in a longitudinal direction of the sample get close to each other, surfaces in a thickness direction of both end portions face each other, and a distance between other surfaces in the thickness direction of both end portions is 3 mm; and
the repulsive force R in an opposing direction of the bent sample is measured.

10. The porous liquid crystal polymer sheet according to claim 9 having a melting point of 200° C. or more.

11. The porous liquid crystal polymer sheet according to claim 9 having a dielectric constant at 10 GHz of 2.50 or less.

12. The porous liquid crystal polymer sheet according to claim 10 having a dielectric constant at 10 GHz of 2.50 or less.

13. A wiring circuit board comprising:
the porous liquid crystal polymer sheet according to claim 11 as an insulating layer.

14. A wiring circuit board comprising:
the porous liquid crystal polymer sheet according to claim 12 as an insulating layer.

15. A wiring circuit board comprising:
the porous liquid crystal polymer sheet according to claim 9 as an insulating layer.

16. A wiring circuit board comprising:
the porous liquid crystal polymer sheet according to claim 10 as an insulating layer.

17. A porous liquid crystal polymer sheet having
a porosity P of 20% or more and 90% or less, and
a thickness T of 1 μm or more and 240 μm or less,
wherein
a repulsive force R of the porous liquid crystal polymer sheet in a low repulsion test described below is 50 [mN/mm] or less, and
the repulsive force R [mN/mm], the thickness T [μm], and the porosity P [%] satisfy Formula [3] below:

$$R/(T/P) \leq 7.5 \quad [3],$$

wherein in the low repulsion test,
the porous liquid crystal polymer sheet is processed into a size of a length of 30 mm and a width of 10 mm to fabricate a sample;
the sample is bent so that both end portions in a longitudinal direction of the sample get close to each other, surfaces in a thickness direction of both end portions face each other, and a distance between other surfaces in the thickness direction of both end portions is 3 mm; and
the repulsive force R in an opposing direction of the bent sample is measured.

18. The porous liquid crystal polymer sheet according to claim 17 having a melting point of 200° C. or more.

19. The porous liquid crystal polymer sheet according to claim 17 having a dielectric constant at 10 GHz of 2.50 or less.

20. The porous liquid crystal polymer sheet according to claim 18 having a dielectric constant at 10 GHz of 2.50 or less.

21. A wiring circuit board comprising:
the porous liquid crystal polymer sheet according to claim 19 as an insulating layer.

22. A wiring circuit board comprising:
the porous liquid crystal polymer sheet according to claim 20 as an insulating layer.

23. A wiring circuit board comprising:
the porous liquid crystal polymer sheet according to claim 17 as an insulating layer.

24. A wiring circuit board comprising:
the porous liquid crystal polymer sheet according to claim 18 as an insulating layer.

* * * * *